R. S. FEND.
AUTOMOBILE.
APPLICATION FILED JUNE 26, 1915.
1,244,045.
Patented Oct. 23, 1917.
2 SHEETS—SHEET 1.
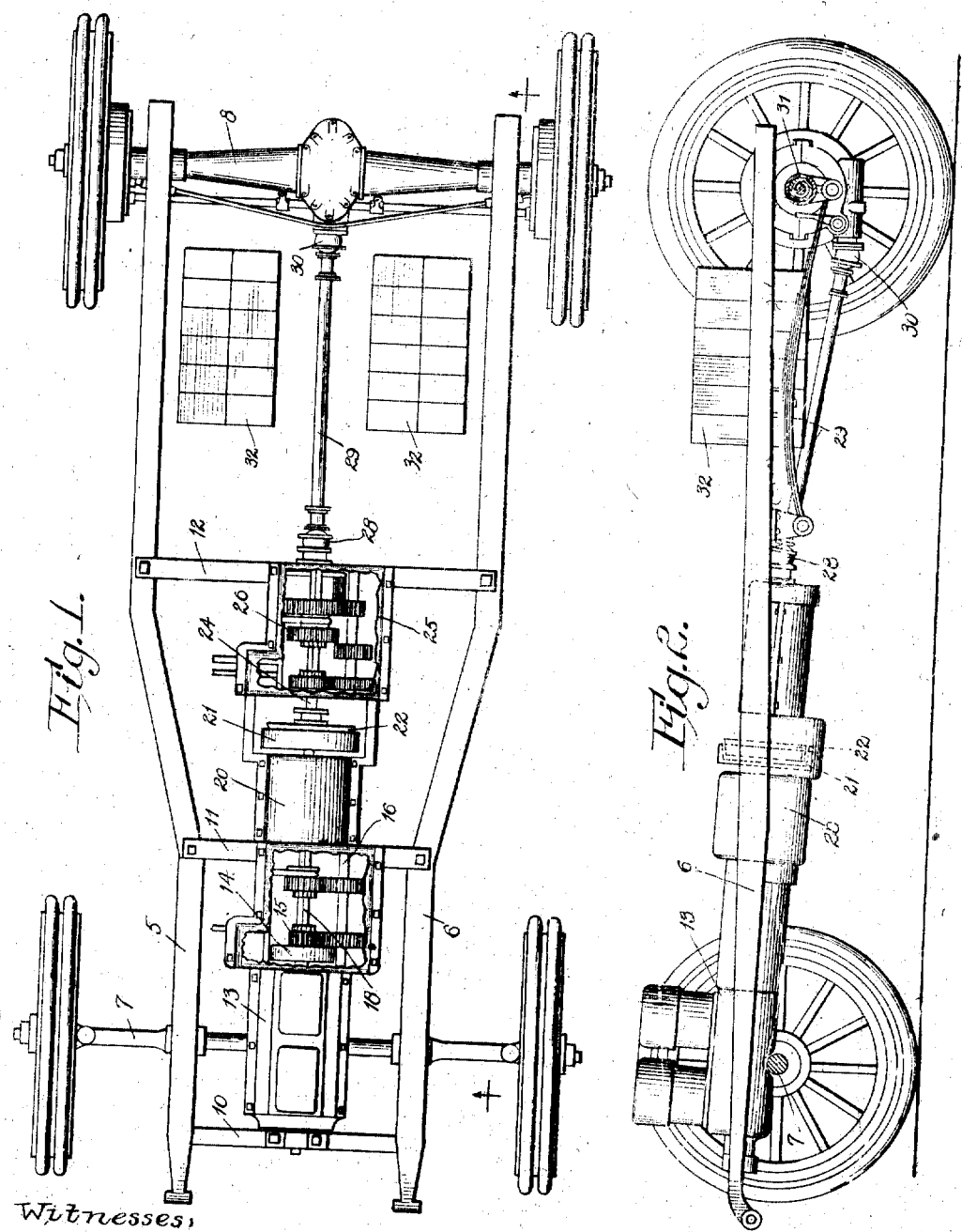
Witnesses:
Albin C. Ahlberg
Robert F. Bracke
Inventor
Roland S. Fend
By Williams & Bradbury
Attorneys

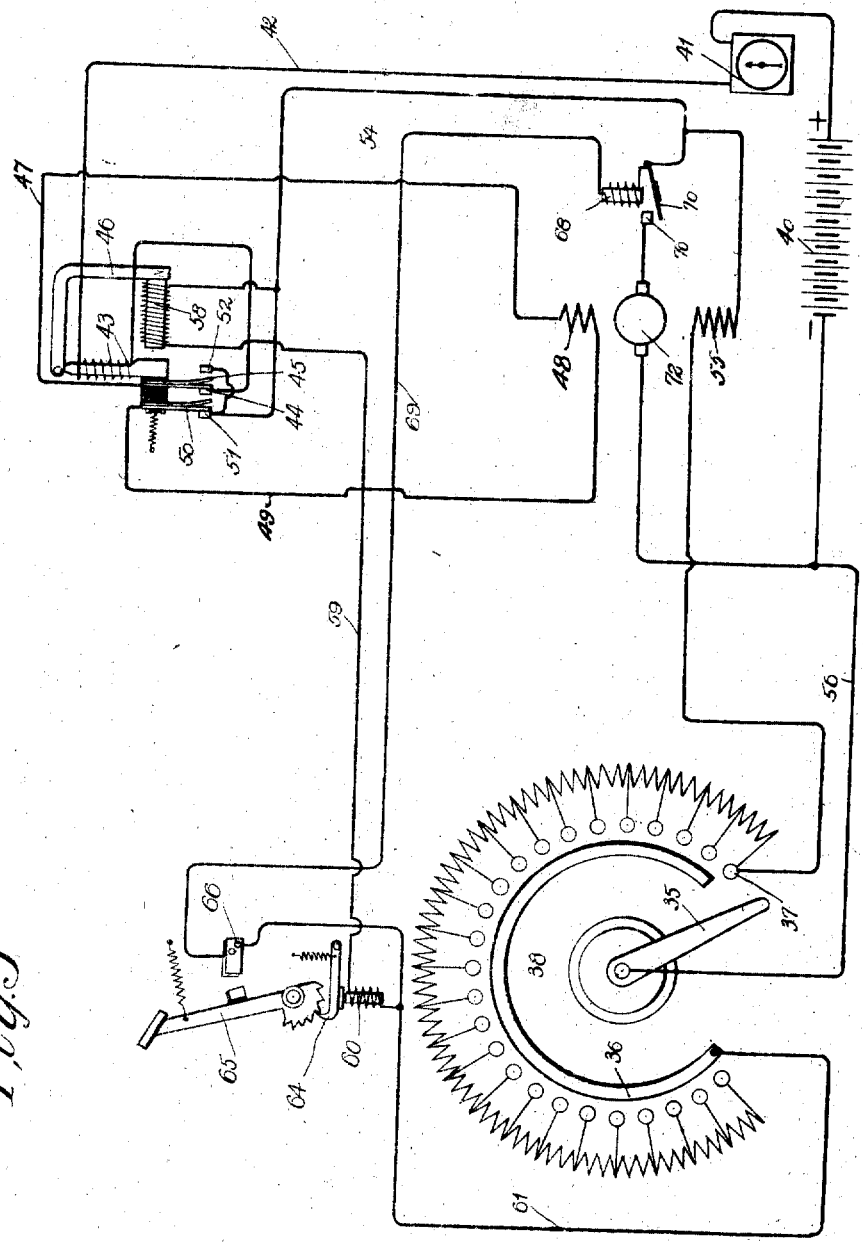

UNITED STATES PATENT OFFICE.

ROLAND S. FEND, OF CHICAGO, ILLINOIS, ASSIGNOR TO WOODS MOTOR VEHICLE COMPANY, OF CHICAGO, ILLINOIS, A CORPORATION OF ILLINOIS.

AUTOMOBILE.

1,244,045.     Specification of Letters Patent.     Patented Oct. 23, 1917.

Application filed June 26, 1915. Serial No. 36,594.

*To all whom it may concern:*

Be it known that I, ROLAND S. FEND, a citizen of the United States, residing at Chicago, in the county of Cook and State of Illinois, have invented a certain new and useful Improvement in Automobiles, of which the following is a full, clear, concise, and exact description, reference being had to the accompanying drawings, forming a part of this specification.

My invention relates to automobiles, and particularly to a type provided with dual propulsion units one of which is preferably in the form of a gasolene engine and the other in the form of an electric dynamo and its accompanying storage battery.

Gasolene driven automobiles of the present day are provided with gasolene engines capable of delivering power largely in excess of that required under ordinary running conditions on level and smooth roads. The necessity for this excess of power lies principally in the desire for rapid acceleration and rapid hill climbing ability. Automobiles of this type which are provided with engines rated at fifty to sixty horse power require only from five to ten horse power for propulsion on level roads at speeds of from ten to twenty miles per hour. The great weight of the gasolene engine and its accompanying sturdily built transmission and driving parts require a correspondingly heavy chassis construction resulting in an automobile of such weight that considerably greater power is required for its normal operation. The control of engines of this size to bring about efficient operation is more complicated than that of smaller engines with the result that these vehicles require skilful and mechanically trained operators.

Electrically driven vehicles of the present day have a great advantage in simplicity of control, but at the same time must carry storage batteries the weight of which brings the total vehicle weight up to substantially the same as that of the modern gasolene driven vehicle.

The vehicle of my present invention is provided with a gasolene engine the size of which is much less for the same sized vehicle than that with which a purely gasolene driven vehicle is provided. It is also provided with an electric dynamo the size of which is somewhat less than those with which purely electric vehicles are provided, and with storage batteries which may be no more than one-third the size and weight of those with which the present day electric vehicles are provided. By a novel arrangement of gear shift mechanism, by means of which the dynamo may be driven at various speeds for different engine speeds and by means of which the vehicle itself may be driven at various speeds for different dynamo speeds, the storage battery may be charged and discharged within the limits of the best storage battery performance by means of which the life of the storage battery is increased many fold. It is well known that storage batteries should never be discharged below a solution density of 1200, and that they should be charged over a solution density of 1250 only occasionally. It has been found impracticable, in the operation of ordinary electric vehicles, to operate within this preferred range of charge and discharge, and it is by reason of the short life of the storage battery under conditions which obtain in use with electric vehicles that the expense of operating these vehicles has made them less economical than purely gasolene vehicles.

Heretofore electric vehicles have been equipped almost universally with series motors, the characteristics of which have certain advantages for this type of vehicle. In order to control the speed and torque of these motors it has been necessary to shift the armature current, directing it either through the field windings in series or parallel relation as the speed and load demands. Controllers for this purpose are expensive and complicated mechanisms and have been a source of considerable trouble in the maintenance of electric vehicles.

By my present invention I propose to use a compound wound dynamo the speed of which is entirely controlled by its shunt windings and I propose to open and close the armature circuit of this motor by an automatically operating relay, thus simplifying the controlling apparatus and decreasing the expense thereof. In order that this dynamo may be provided with a sufficient number of series turns that its characteristics will be somewhat similar to those of a purely series motor and may, nevertheless, act efficiently as a generator when driven by the gasolene engine, I have provided a reversing switch which automatically operates to reverse the direction of current through the series field winding at the moment when the dynamo shifts in its operation to that of a generator. Other features of my invention will be more particularly pointed out in the following specification and appended claims.

My invention is illustrated in the accompanying drawings in which like characters designate like elements throughout the different views, and in which Figure 1 is a plan of the chassis showing the distribution of power elements thereon.

Fig. 2 is an elevation of the chassis with parts cut away to more clearly disclose the relative positions of the power elements; and Fig. 3 is a power circuit diagram.

Any suitable form of chassis construction may be employed with my invention. The one herein illustrated comprises a pair of lineal channels 5 and 6 supported upon the front axle 7 and rear axle housing 8 and united by the transverse members 10, 11, and 12. The gasolene engine 13 has its crank shaft directly connected with the fly wheel 14 and the forward gear 15 of the gear shift mechanism 16, which mechanism is of a well known construction providing two motor speeds, one equal to that of the engine, and the other somewhat greater, preferably twice that of the engine, and providing also an intermediate position in which the engine and motor are entirely separated. The rearwardly extending shaft 18 of the gear shift mechanism is directly connected with the armature of the dynamo 20, the shaft of which carries at its rear end the pan 21 of a mechanically operated clutch. The cone member 22 of this clutch may be operated by any suitable shifting mechanism, not here illustrated, so as to bring it into and out of engagement with the clutch pan, it being reciprocatively mounted upon the shaft 24 which extends into the forward end of the gear shift mechanism 25 and carries thereon a gear 26. This gear shift mechanism is of the usual form with the exception that it has no reversing position, the reverse being brought about by the operation of the dynamo 20 in its reverse direction. The rearwardly extending shaft of this gear shift mechanism is connected with a universal joint 28 and through that with the propeller shaft 29, second universal joint 30, and by means of a worm fed differential with the sections of the rear axle 31.

The storage battery 32 is preferably mounted in a suitable manner in the body portion of the vehicle, not herein illustrated, and is for that reason merely illustrated in a satisfactory position with reference to the chassis. It is to be understood that the gear shift mechanism herein illustrated is to be used only when the conditions under which the vehicle is to be operated change, the circuits to be hereinafter described providing a sufficient control over the electric motor that for ordinary use the engine and motor may be directly connected one with the other and the clutch drum and propeller shaft may likewise be directly connected. This is the condition which will ordinarily prevail in driving the vehicle upon city streets and on comparatively level and smooth country roads.

In Fig. 3 the circuit for the motor is diagrammatically illustrated. In the operation of the vehicle the lever arm 35, which is preferably magnetically connected with the lever on the operator's steering wheel, is moved to a position in which it contacts with the segment 36 and the button 37 of the variable resistance device 38. In this position of the lever 35 circuits are completed from the battery 40 through the ampere hour meter 41, conductor 42, series coil 43 and contacts 44 and 45 of electromagnetic device 46, conductor 47, series dynamo field coils 48, conductor 49, contacts 50 and 51 of electro-magnetic device 46, and thence dividing through the paths including conductor 54, shunt dynamo coils 55, rheostat button 37, arm 35, and conductor 56 to the negative pole of battery 40, the other portion including the high resistance winding 58 of electro-magnetic device 46, conductor 59, electro-magnet 60, conductor 61, segment 36, arm 35, and conductor 56 to the negative pole of the battery. That portion of the current which traverses the first path energizes the motor field to a comparatively high saturation. That portion which traverses electro-magnets 58 and 60 causes the operation of the electro-magnetic device 46 and causes the withdrawal of the pawl 64 from the ratchet of the brake lever 65 so that that lever may be released to cause the closure of the switch 66. When the brake lever 65 is released by the foot so that the switch 66 is closed a circuit is completed from the positive pole of battery 40 through ampere hour meter 41, conductor 42, series coil 43 and contacts 44 and 50 of the now actuated electro-magnetic device 46, conductor 49, series dynamo coils 48, conductor 47, contacts 45 and 52 of electro-magnetic device 46, conductor 54, coil of relay 68, conductor 69, switch plates 66, conductor 61, segment 36, arm 35 of rheostat 38, and conductor 56 to the negative pole of battery 40. The current in this path actuates relay 68 closing its contacts 70 and 71 in the circuit of the dynamo armature 72, which circuit includes the same conductors as just heretofore traced from the positive pole of battery 40 to the point at which the armature 70 of relay 68 joins conductor 54, thence through contacts 70 and 71 of relay 68, armature 72 of the dynamo, and conductor 56 to the negative pole of battery 40. Upon the first rush of current in this path the coil 43 of eletromagnetic device 46, and its pivoted core, becomes strongly magnetized in a direction which opposes the magnetization of coil 58 and causes the electro-magnetic device 46 to change its position from that of attraction to that in which the device is illustrated, thus causing the current to pass through the series dynamo coils in the proper direction to increase the saturation of the dynamo fields.

The gasolene engine is preferably provided with automatic spark advances so that it is controlled by the simple movement of a single throttle lever. It is to be understood that the dynamo in starting up through the circuit arrangement just heretofore described carries the engine crank shaft with it, either at the full speed of the dynamo, or at half the speed of the dynamo, depending upon the setting of the gear shift mechanism 16. By the movement of the arm 35 over the contacts of the rheostat 38 resistance is included in series with the shunt field coils 55 and the magnetization of the dynamo field thereby decreased and the motor speed consequently increased.

For each setting of the lever 35 a dynamo speed may be obtained by the aid of the gasolene engine at which the dynamo will cease to operate as a motor, but will generate in its armature a voltage equal to that of the storage battery with which the armature is connected. If the speed is increased above this point the voltage generated in the motor armature will cause a reversal of current in the armature and a consequent charge of the battery 40. Either at, or slightly in advance of the reversal of current in the armature circuit, the electro-magnetic device 46, by reason of the lack of magnetization in its winding 43, or by reason of a reversal of such magnetization, changes its position causing the current generated in the armature to flow in the opposite direction through the series coils 48, thus aiding in the magnetization of the field, instead of subtracting from it, as would be the case if there were no reversal of current through the series coils. If a hill, or rough roads, is encountered so that the speed of the vehicle is slightly decreased the generator 72 will immediately be reconverted into a dynamo causing the current to again reverse through the series coil 43 of the electro-magnetic device 46, which reversal acts to release the armature portion of the electro-magnetic device 46, thus bringing the series winding 48 of the dynamo field back into circuit with current flowing in the proper direction to strengthen the dynamo field.

Although I have shown and described my invention with particular reference to the details herein illustrated, it is to be understood that certain modifications of this specific arrangement may be made without departing from the spirit or scope of my invention.

Having thus described my invention, what I claim as new and desire to secure by Letters Patent of the United States is:

1. A motor vehicle having a driving axle, an electric dynamo and a gasolene engine for propelling the vehicle, ratio changing gears between the engine and dynamo by means of which the engine and dynamo may be directly connected, or connected to operate at different speeds, a second ratio changing gear mechanism, a friction clutch interposed between the dynamo and said second gear mechanism, and a propeller shaft operatively connecting the second ratio changing gear mechanism with the driving axle.

2. A motor vehicle provided with a storage battery and having a gasolene engine, a ratio changing gear mechanism directly connected therewith, an electric dynamo with its armature directly connected with said ratio changing gear mechanism, a friction clutch, a second ratio changing gear mechanism, a propeller shaft and a driving axle, arranged in the order named from the front to the rear of the vehicle, said engine and dynamo being adapted to either separately, or together, propel the vehicle.

3. In a motor vehicle, the combination with a gasolene engine and an electric dynamo of a sliding gear transmission interposed between the engine and the dynamo and having a neutral position in which the engine and dynamo are disengaged whereby the dynamo may be operated without the engine, and connecting means including the clutch and second sliding gear transmission for operatively driving the rear wheels of the vehicle.

In witness whereof, I hereunto subscribe my name this 18th day of June, A. D. 1915.

ROLAND S. FEND.

Witnesses:
  THOMAS CLEMENTS,
  W. B. KENNEDY.